United States Patent
Kassai

(10) Patent No.: US 8,108,354 B2
(45) Date of Patent: Jan. 31, 2012

(54) ARCHIVE DEVICE, METHOD OF MANAGING ARCHIVE DEVICE, AND COMPUTER PRODUCT

(75) Inventor: Kunihiko Kassai, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 101 days.

(21) Appl. No.: 10/785,946

(22) Filed: Feb. 26, 2004

(65) Prior Publication Data

US 2005/0010619 A1 Jan. 13, 2005

(30) Foreign Application Priority Data

Jul. 10, 2003 (JP) ................................. 2003-194948

(51) Int. Cl.
*G06F 7/00* (2006.01)
*G06F 17/00* (2006.01)
*G06F 17/30* (2006.01)
(52) U.S. Cl. ........................................ 707/665; 707/802
(58) Field of Classification Search .................. 707/204, 707/665, 802
See application file for complete search history.

(56) References Cited

U.S. PATENT DOCUMENTS

| 5,873,085 | A | 2/1999 | Enoki et al. | |
|---|---|---|---|---|
| 2002/0147734 | A1 * | 10/2002 | Shoup et al. | .................. 707/200 |
| 2002/0156887 | A1 | 10/2002 | Hashimoto | |
| 2004/0230624 | A1 * | 11/2004 | Frolund et al. | ................. 707/204 |

FOREIGN PATENT DOCUMENTS

| JP | 5-197500 | 8/1993 |
|---|---|---|
| JP | 5-233388 | 9/1993 |
| JP | 6-266600 | 9/1994 |
| JP | 7-191811 | 7/1995 |
| JP | 7-146760 | 6/1996 |
| JP | 9-128163 | 5/1997 |
| JP | 10-3421 | 1/1998 |
| JP | 10-254629 | 9/1998 |
| JP | 11-143647 | 5/1999 |
| JP | 2000-99384 | 4/2000 |
| JP | 2001-51890 | 2/2001 |
| JP | 2002-312126 | 10/2002 |
| JP | 2003-50733 | 2/2003 |
| JP | 2005-505039 | 2/2005 |
| JP | 2005-513838 | 5/2005 |
| WO | 03/027891 A1 | 4/2003 |
| WO | 03/052620 A1 | 6/2003 |

OTHER PUBLICATIONS

Japanese Office Action mailed on Mar. 10, 2009 in corresponding Japanese Patent Application 2003-194948.

* cited by examiner

*Primary Examiner* — Jacob F Betit
(74) *Attorney, Agent, or Firm* — Staas & Halsey LLP

(57) ABSTRACT

When a sub-archive device is newly added, a policy related to an archive method is set in the sub-archive device according to information of addition from the sub-archive devices. The sub-archive device added is linked to a main archive device. Uniform management of a location of each data file archived in the main archive device and the sub-archive device added is performed based on the information of addition. When a retrieval request for a data file is received from an external unit, a location of the data file is retrieved, and a retrieval result is informed to the external device.

19 Claims, 11 Drawing Sheets

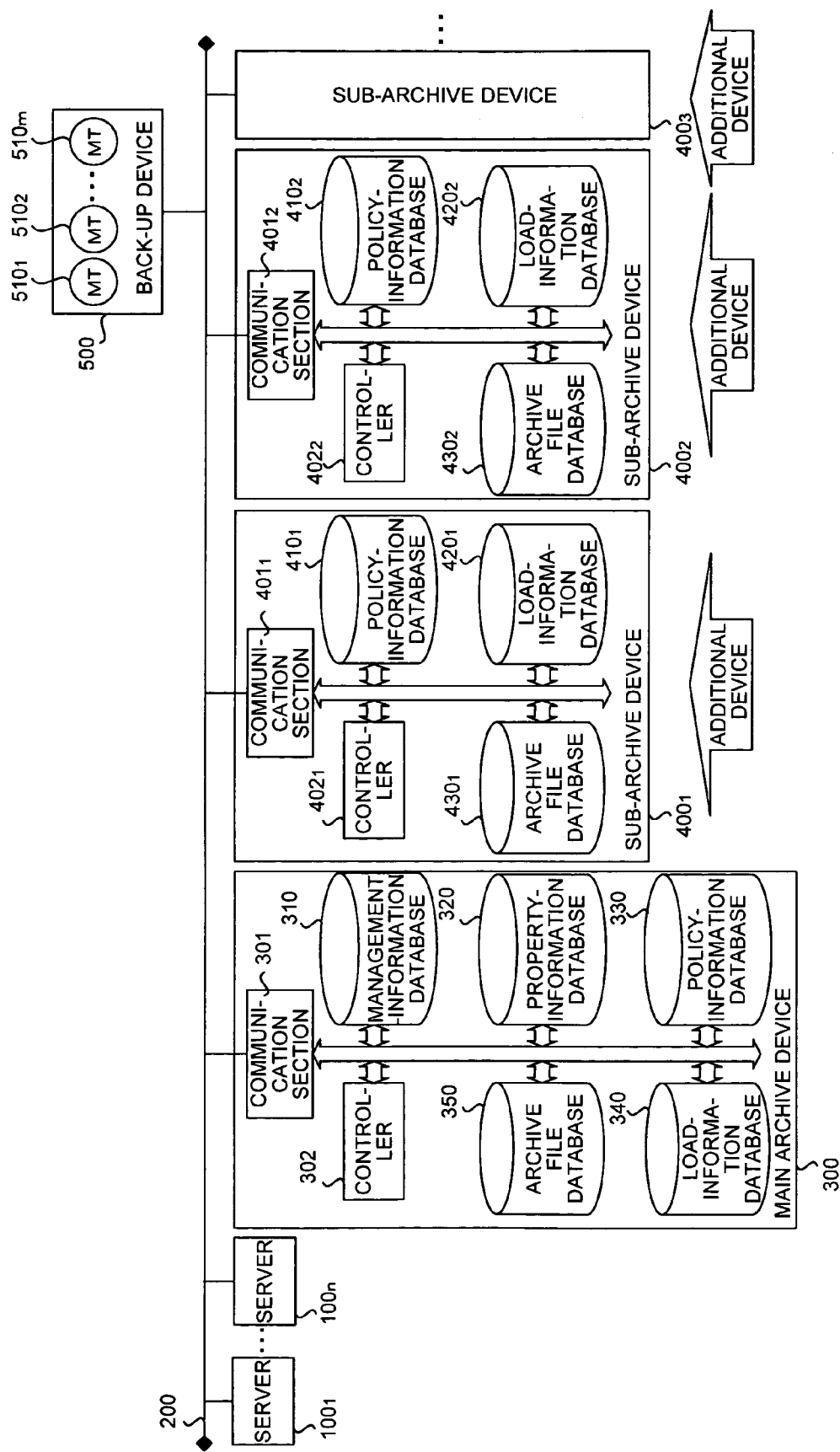

| DEVICE NAME | MAIN ARCHIVE DEVICE 300 |
|---|---|
| POLICY | POLICY 1, POLICY 2, POLICY 3, POLICY 4, POLICY 5 |
| PRIORITY ORDER OF POLICY SETTING | POLICY 5, POLICY 4, POLICY 3, POLICY 2 |

| DEVICE NAME | MAIN ARCHIVE DEVICE 300 | SUB-ARCHIVE DEVICE 4001 ← ADDITIONAL DEVICE |
|---|---|---|
| POLICY | POLICY 1, POLICY 2, POLICY 3, POLICY 4 | POLICY 5 |
| PRIORITY ORDER OF POLICY SETTING | POLICY 4, POLICY 3, POLICY 2 | — |

| DEVICE NAME | MAIN ARCHIVE DEVICE 300 | SUB-ARCHIVE DEVICE 4001 | SUB-ARCHIVE DEVICE 4002 ← ADDITIONAL DEVICE |
|---|---|---|---|
| POLICY | POLICY 1, POLICY 2, POLICY 3 | POLICY 5 | POLICY 4 |
| PRIORITY ORDER OF POLICY SETTING | POLICY 3, POLICY 2 | — | — |

| DEVICE NAME | MAIN ARCHIVE DEVICE 300 | SUB-ARCHIVE DEVICE 4001 | SUB-ARCHIVE DEVICE 4002 | SUB-ARCHIVE DEVICE 4003 ← ADDITIONAL DEVICE |
|---|---|---|---|---|
| POLICY | POLICY 1, POLICY 2 | POLICY 5 | POLICY 4 | POLICY 3 |
| PRIORITY ORDER OF POLICY SETTING | POLICY 2 | — | — | — |

US 8,108,354 B2

ARCHIVE DEVICE, METHOD OF MANAGING ARCHIVE DEVICE, AND COMPUTER PRODUCT

BACKGROUND OF THE INVENTION

1) Field of the Invention

The present invention relates to a technology for setting information about newly added devices.

2) Description of the Related Art

Archive devices that archive vast number of files (including data) scattered in a network and read a desired file according to retrieval request from a user are know in the art. To archive means to store a plurality of files collectively and perform uniform management of the files stored.

FIG. 12 is a block diagram of a conventional archive system. This archive system includes servers $10_1$ to $10_n$ that store various files like image files, text files, and video files. The servers $10_1$ to $10_n$ are connected to a local area network (LAN) 20.

An archive device $30_1$ is connected to the LAN 20. The archive device $30_1$ has a function of storing archive files in a database after acquiring files corresponding to policies according to predetermined policies from the servers $10_1$ to $10_n$ as archive files.

Moreover, the archive device $30_1$ has a function of retrieving desired files from the archive files based on a file retrieval request from any one of the servers $10_1$ to $10_n$ (or a not shown client) and returning a result of the retrieval.

Since archive files accumulate in the archive device $30_1$ on daily basis, on one day the archive device $30_1$ becomes full and there occurs lack of capacity. When the archive device $30_1$ becomes full, archive device $30_2$ is added to the LAN 20. Similarly, when the archive device $30_2$ becomes full, archive device $30_3$ is added to the LAN 20.

When the archive devices $30_2$ and $30_3$ are to be added to the LAN 20, an administrator sets information (like network address, device space) of the archive devices $30_2$ and $30_3$ in the servers $10_1$ to $10_n$ separately.

Thus, the servers $10_1$ to $10_n$ recognize the three archive devices $30_1$, $30_2$, and $30_3$ independently as devices where the files are to be archived.

After the archive devices are added, the servers $10_1$ to $10_n$ acquire storage information of archive files (like file name, storage area) from the archive devices $30_1$, $30_2$, and $30_2$ respectively and performs management.

For example, the server $10_1$ sends a file retrieval request to an archive device (for example archive device $30_2$) after recognizing the archive device $30_2$ that stores the file from the stored information before sending a file-retrieval request. Conventional technologies are disclosed in Japanese Patent Application Laid-open Publication Nos. H7-191811 and 2000-99384.

However, when a new archive device is added, it is necessary to set information to identify the new archive device separately in the servers. This results in increased load on the administrator.

Moreover, the archive devices connected to the LAN are independent and have no link with each other. Therefore, if access occurs continuously to only a specific archive device, considerable load is exerted on that archive device. As a result, there is a decline in the efficiency.

SUMMARY OF THE INVENTION

It is an object of the present invention to solve at least the problems in the conventional technology.

A method of managing an archive device that archives data files, according to an aspect of the present invention includes setting, when another archive device that is added newly, a policy related to an archive method in the archive device added according to information of addition from the archive device added; linking the archive device to the archive device added; performing uniform management of a location of each data file archived in the archive device to the archive device added according to the information of addition; receiving collectively retrieval requests for a data file from an external unit; retrieving a location of the data file; and informing a retrieval result to the external device.

An archive device that archives a data file according to another aspect of the present invention includes a policy-setting unit that, when another archive device that is added newly, sets a policy related to an archive method in the archive device added according to information of addition from the archive device added; a managing unit that links the archive device to the archive device added and performs uniform management of a location of each data file archived in the archive device to the archive device added according to the information of addition; a retrieving unit that receives collectively retrieval requests for a data file from an external unit, retrieves a location of the data file, and informs a retrieval result to the external device.

The computer program according to still another aspect of the present invention realizes on a computer the method according to the above aspect.

The other objects, features, and advantages of the present invention are specifically set forth in or will become apparent from the following detailed descriptions of the invention when read in conjunction with the accompanying drawings.

BRIEF DESCRIPTION OF THE DRAWINGS

FIG. 1 is a block diagram of an archive system according to an embodiment of the present invention;

FIGS. 2A, 2B, 2C, and 2D are tabular representations of management-information database;

DETAILED DESCRIPTION

Figure 3:
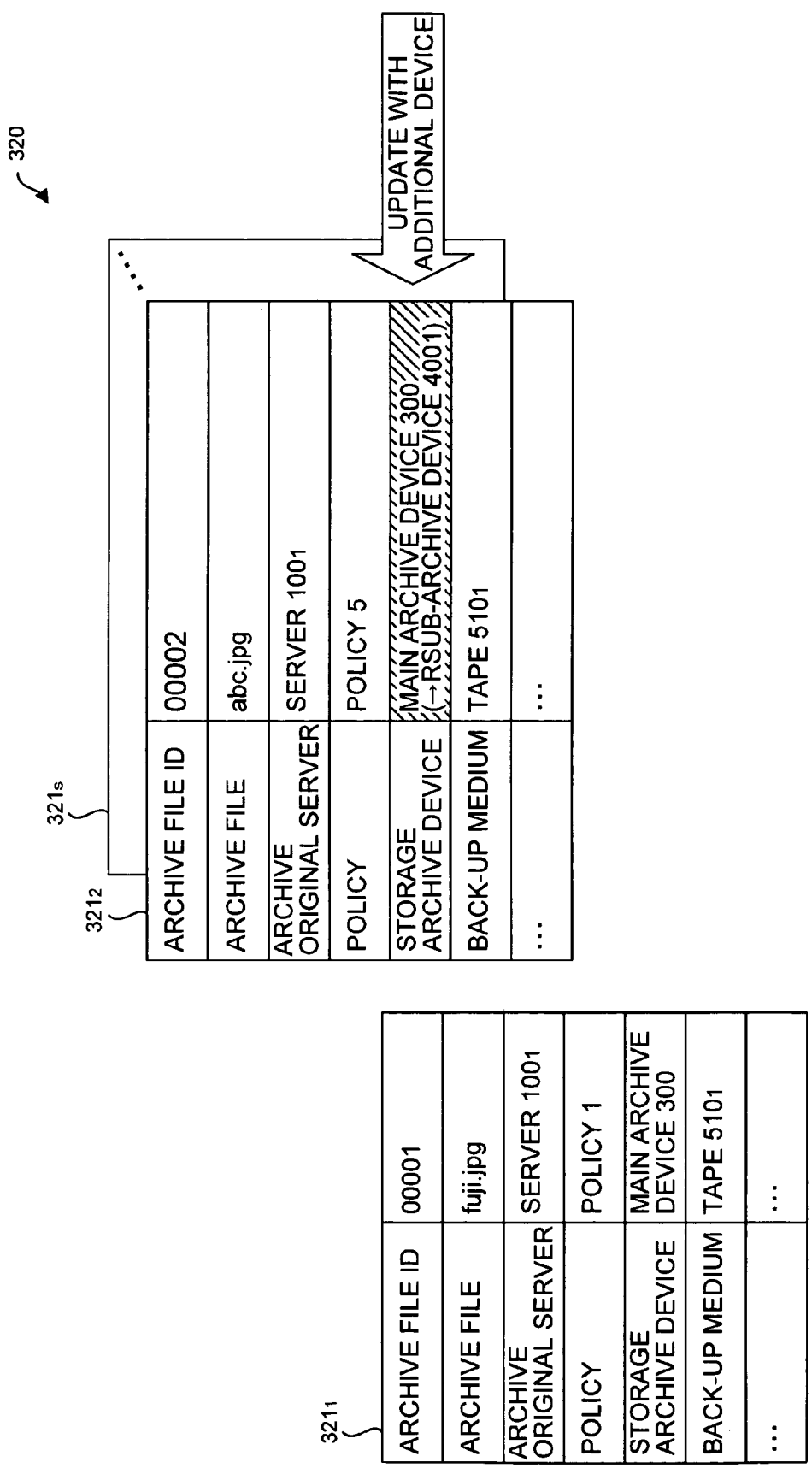
FIG. 3 is a property-information database.

Exemplary embodiments of an archive device, a method of managing the archive device, and a computer product according to the present invention are described in detail below with reference to accompanying drawings.

FIG. 1 is a block diagram of a configuration of an archive system according to the present invention. An archive system that archives a vast amount of files (including data) scattered in servers $100_1$ to $100_n$ in a LAN 200 in a main archive device 300 (that includes sub-archive devices $400_1$, $400_2$, $400_3$, . . . upon addition) and reads a desired file according to a retrieval request from a user is shown in FIG. 1.

In an initial system, only the main archive device 300 is provided as archive device and the sub-archive devices $400_1$, $400_2$, $400_3$, . . . are not provided. The sub-archive devices $400_1$, $400_2$, $400_3$, . . . are provided additionally when the main archive device lacks capacity.

The servers $100_1$ to $100_n$ are file servers that store image files, text files, video files etc. and are connected to the LAN 200. The servers $100_1$ to $100_n$ have a function of outputting a file-retrieval request to the main archive device 300.

The main archive device 300 has a function of storing archive files in an archive file database 350 after acquiring files corresponding to policies from the servers $100_1$ to $100_n$ according to predetermined policies, as archive files.

The main archive device 300 also has a function of management (control) of each sub-archive device after the sub-archive devices $400_1$, $400_2$, $400_3$, . . . etc. are added. The management includes for example load management of the sub-archive devices $400_1$, $400_2$, $400_3$, . . . and management related to restoration of files of the sub-archive devices $400_1$, $400_2$, $400_3$ etc.

The sub-archive devices $400_1$, $400_2$, $400_3$, . . . are added to the main archive device 300 one after the other and are managed by the main archive device 300.

The sub-archive devices $400_1$, $400_2$, $400_3$, . . . have a function of storing files in archive file databases $430_1$, $430_2$, . . . after acquiring files corresponding to policies according to predetermined policies from the servers $100_1$ to $100_n$ as archive files.

A back-up device 500 is connected to the LAN 200. The back-up device 500 stores archive files same as the archive files stored in the main archive device 300 and the sub-archive devices $400_1$, $400_2$, $400_3$ as backed-up in at least one of tapes $510_1$ to $510_m$. The tapes $510_1$ to $510_m$ are magnetic tapes that are used as secondary recording media.

In the main archive device 300, a communication section 301 controls communication according to a predetermined communication protocol. A controller 302 performs controls related to management of the sub-archive devices $400_1$, $400_2$, $400_3$, . . . after storing of the archive files or addition of the sub-archive devices. Details of operation of the controller 302 are described in the latter part.

A management-information database 310 stores management information for management of the main archive device 300 and the sub-archive devices $400_1$, $400_2$, $400_3$, . . . .

Concretely, in the initial system, the management-information database 310 includes, DEVICE NAME, POLICY, and PRIORITY ORDER OF POLICY SETTING as shown in FIGS. 2A to 2D.

DEVICE NAME indicates archive device (main archive device 300, sub-archive devices $400_1$, $400_2$, $400_3$, . . . ). POLICY indicates a policy for an archive device corresponding to the device name.

Policy defines archive method of file for each file. Concretely, each policy is defined by policy information $331_1$, $331_2$, . . . , and $331_5$ shown in FIG. 4.

Further, policy information $331_1$, $331_2$, . . . , and $331_5$ define policies 1, 2, . . . , and 5. Concretely, the policy information $331_1$ includes items such as POLICY, ARCHIVE ORIGINAL SERVER, ARCHIVE ORIGINAL DIRECTORY, RANGE OF DIRECTORY RETRIEVAL, ARCHIVE FILE, BACK-UP TIMING, BACK-UP MEDIUM, CLASSIFICATION OF BACK-UP MEDIUM, CONTACT ADDRESS IN A CASE OF ABNORMALITY etc.

Figure 4:
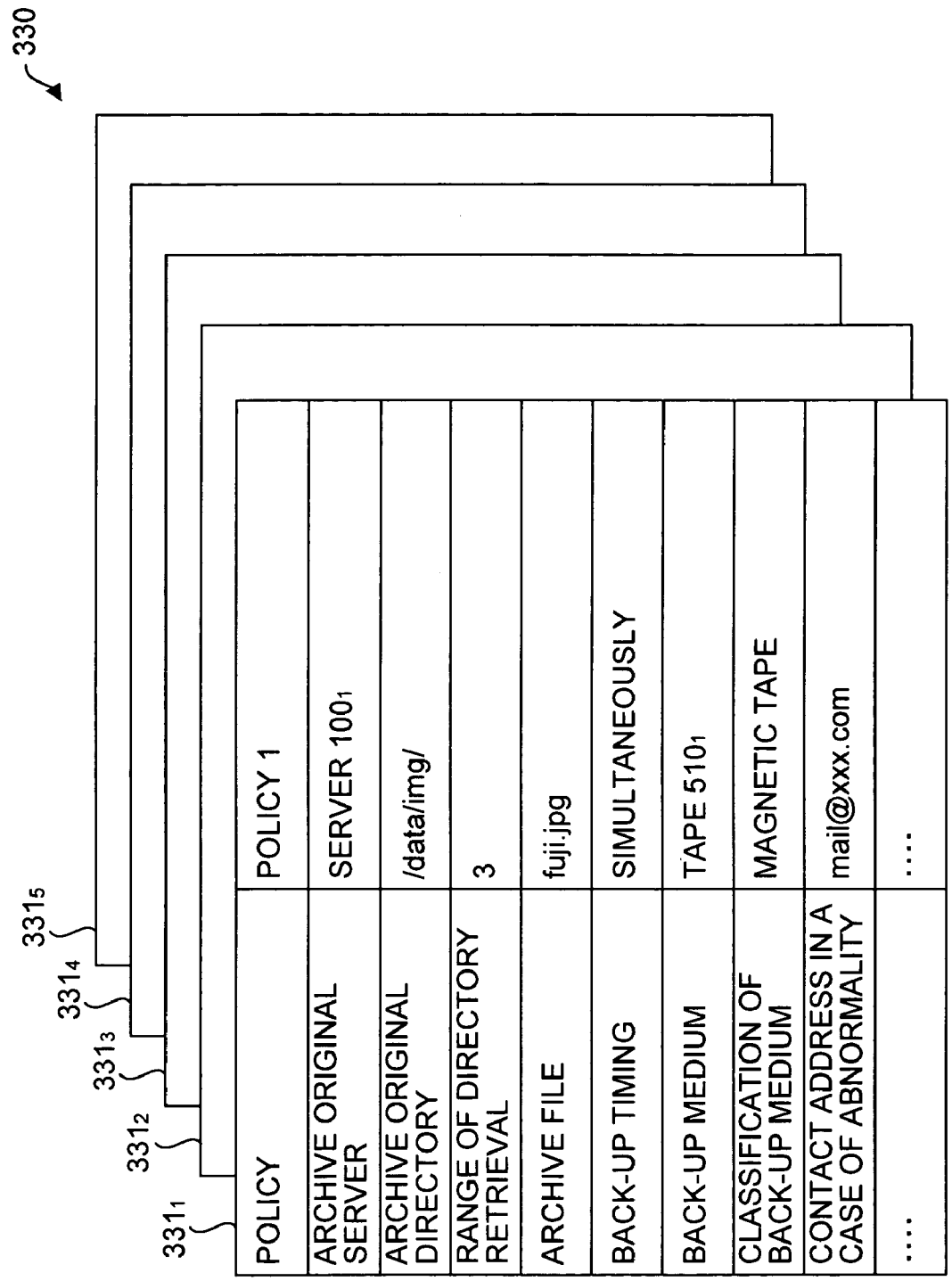
FIG. 4 is a policy-information database.

POLICY indicates a policy (policy 1 in FIG. 4). ARCHIVE ORIGINAL SERVER indicates a server (server $100_1$ in FIG. 4) that originally stores a file to be archived (hereinafter, "archive file"). ARCHIVE ORIGINAL DIRECTORY indicates a directory in which the archive file is stored in the server $100_1$.

RANGE OF DIRECTORY RETRIEVAL indicates a range (three layered directory in FIG. 4) for retrieval of the archive file in the directory of the server $100_1$. ARCHIVE FILE indicates the archive file.

BACK-UP TIMING indicates timing of taking a back-up of the archive file in the back-up device 500 when the archive file is archived in the archive device (like main archive device 300). In FIG. 4, the archive file is backed-up in the back-up device 500 simultaneously with archive in the archive device.

BACK-UP MEDIUM indicates a medium (tape $510_1$ in FIG. 4) for recording an archive file that is backed-up. CLASSIFICATION OF BACK-UP MEDIUM indicates a class (kind) (magnetic tape) of the BACK-UP MEDIUM (tape $510_1$). CONTACT ADDRESS IN A CASE OF ABNORMALITY indicates an address to be contacted (for example, e-mail address of the main archive device 300) when there is an abnormality in a process related to the archive file.

In the policy information $331_2$ to $331_5$, policies 2 to 5 are defined similarly as in the policy information $331_1$ (corresponding to policy 1).

FIG. 2A is a tabular representation of the management-information database 310 in the initial system (archive device includes the main archive device 300 only). The main archive device 300 is for all the policies 1 to 5. PRIORITY ORDER OF POLICY SETTING indicates a priority order of policies that are to be set in the sub-archive devices when the sub-archive devices are added after the main archive device 300 lacks capacity.

FIG. 2B is a tabular representation of the management-information database 310 when the sub-archive device $400_1$ is added to the main archive device 300. Policy 5 (top of the priority order of policy setting shown in FIG. 2A) is set in POLICY for the sub-archive device $400_1$. Whereas, in the main archive device 300, POLICY is updated from policies 1 to 5 (refer to FIG. 2A) to policies 1 to 4 (policy 5 is deleted) and PRIORITY ORDER OF POLICY SETTING is updated from policies 5 to 2 (refer to FIG. 2A) to 4 to 2 (policy 5 is deleted).

FIG. 2C is a tabular representation of the management-information database 310 when the sub-archive device $400_2$ is added to the main archive device 300 and the sub-archive device $400_1$. Policy 4 (top of the priority order of policy setting shown in FIG. 2B) is set in POLICY for the sub-archive device $400_2$. Whereas, in the main archive device 300, POLICY is updated from policies 1 to 4 (refer to FIG. 2B) to policies 1 to 3 (policy 4 is deleted) and PRIORITY ORDER OF POLICY SETTING is updated from policies 4 to 2 (refer to FIG. 2B) to policies 3 and 2 (policy 4 is deleted).

FIG. 2D is a tabular representation of the management-information database 310 when the sub-archive device $400_3$ is added to the main archive device 300, the sub-archive device $400_1$, and the sub-archive device $400_2$. Policy 3 (top of the priority order of policy setting shown in FIG. 2C) is set in POLICY for the sub-archive device $400_3$. Whereas, in the main archive device 300, POLICY is updated from policies 1 to 3 (refer to FIG. 2C) to policies 1 and 2 (policy 3 is deleted) as well as PRIORITY ORDER OF POLICY SETTING is updated from policies 3 and 2 (refer to FIG. 2C) to policy 2 (policy 3 is deleted).

Referring back to FIG. 1, a property-information database 320 stores property information of archive files. Concretely, the property-information database 320 stores property information $321_1$, $321_2$, . . . , and $321_5$ as shown in FIG. 3.

The property information $321_1$ includes ARCHIVE FILE ID, ARCHIVE FILE, ARCHIVE ORIGINAL SERVER, POLICY, STORAGE ARCHIVE DEVICE, and BACK-UP MEDIUM etc.

ARCHIVE FILE ID is identification data (an identifier) for uniquely identifying the archive files. ARCHIVE FILE indicates archive file that is archived and corresponds to ARCHIVE FILE shown in FIG. 4. ARCHIVE ORIGINAL SERVER indicates a server that originally stores the archive files (server $100_1$ in FIG. 3) and corresponds to ARCHIVE ORIGINAL SERVER shown in FIG. 4.

POLICY indicates a policy associated with the archive file (policy 1 in FIG. 3) and corresponds to POLICY in FIG. 4. STORAGE ARCHIVE DEVICE indicates an archive device that stores the archive files (main archive device in FIG. 3).

BACK-UP MEDIUM indicates where the archive file is to be backed-up in the back-up device 500 (tape $501_1$ in FIG. 3) and corresponds to BACK-UP MEDIUM in FIG. 4.

The property information $321_2$, similar to the property information $321_1$ includes ARCHIVE ID, (00002), ARCHIVE FILE (abc.jpg), ARCHIVE ORIGINAL SERVER (server $100_1$), POLICY (policy 5), STORAGE ARCHIVE DEVICE (main archive device 300 in the initial system), BACK-UP MEDIUM etc. Other property information includes similar items.

Referring back to FIG. 1, a policy-information database 330 stores the policy information $331_1$ to $331_5$ (refer to FIG. 4). A load-information database 340 stores load information related to load in archive devices (main archive device 300, sub-archive devices $400_1$, $400_2$, and $400_3$).

Figure 5:
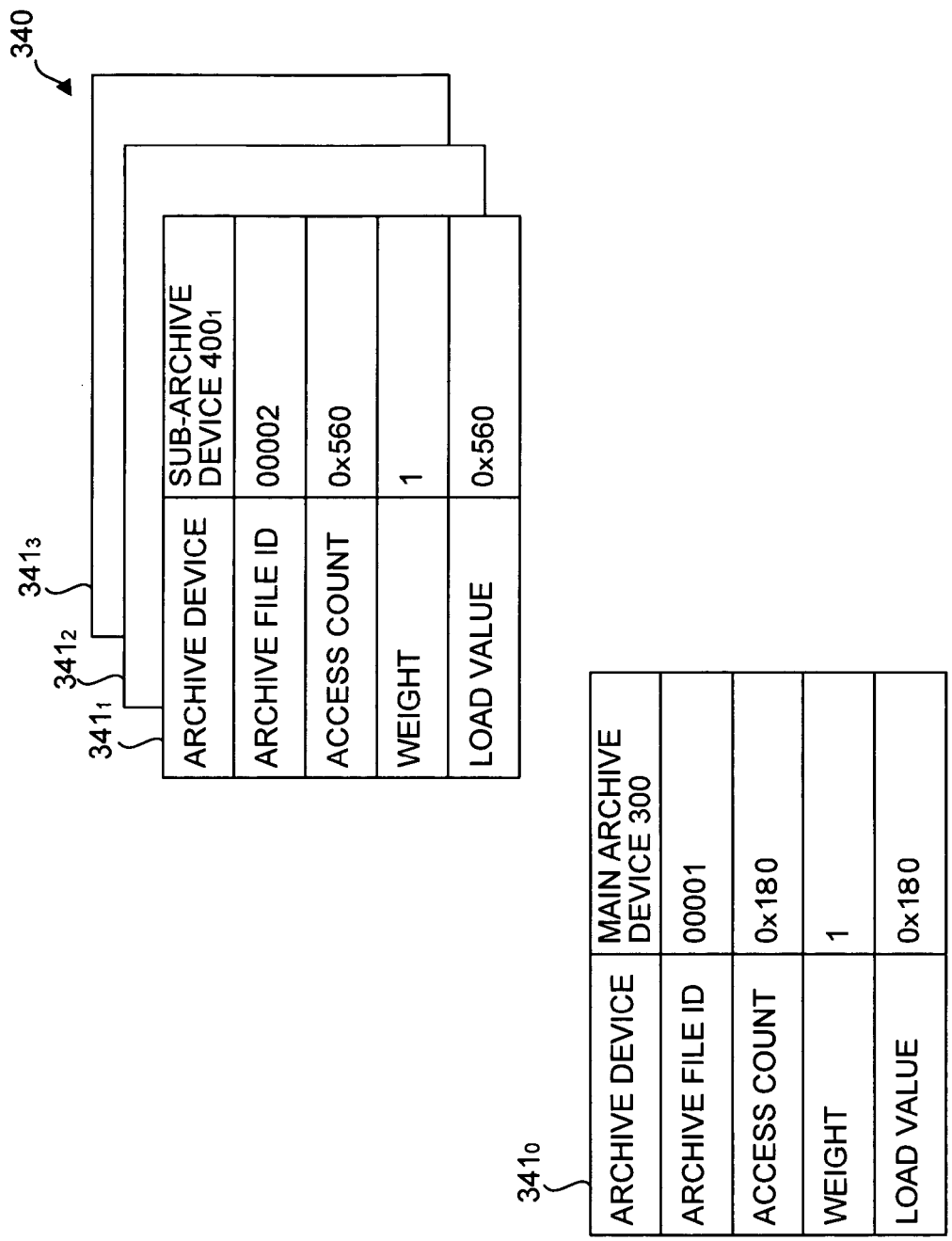
FIG. 5 is a load-information database.

Concretely, the load-information database 340 stores load information $341_0$, $341_1$, $341_2$, and $341_3$ shown in FIG. 5. The load information $341_0$ indicates load on the main archive device 300 and includes ARCHIVE DEVICE, ARCHIVE FILE ID, ACCESS COUNT, WEIGHT, and LOAD VALUE.

ARCHIVE DEVICE indicates the archive device (main archive device 300 in FIG. 5). ARCHIVE FILE ID is identification data (an identifier) for uniquely identifying the archive files that are stored in the archive device and corresponds to ARCHIVE FILE ID shown in FIG. 3.

ACCESS COUNT indicates number of accesses made to the archive file. WEIGHT is a weight parameter used for calculating the load value mentioned in the latter part. LOAD VALUE is a parameter that indicates the load on the archive device as a fixed quantity. LOAD VALUE is obtained by multiplying number of the archive files, the access count, and the weight.

The load information $341_1$ corresponds to the sub-archive device $400_1$ and similar to the load information $341_0$, includes ARCHIVE DEVICE (sub-archive device $400_1$), ARCHIVE FILE ID (00002), ACCESS COUNT (0x560), WEIGHT (1), and LOAD VALUE 0x560. The load information $341_2$ and $341_3$ correspond to the sub-archive device $400_2$ and $400_3$ and include similar items as in the load information $341_0$.

Referring back to FIG. 1, the archive file database 350 stores archive files that are acquired from at least any one of the servers $100_1$ to $100_n$ according the policy.

In the sub-archive device $400_1$, a communication section $401_1$ controls communication according to a predetermined protocol. A controller $402_1$ performs controls related to storage of the archive files, creation of the load information $341_1$ (refer to FIG. 5), and setting of policy information etc. Details of operation of the controller $402_1$ are described in the latter part.

A policy-information database $410_1$ stores policy information (for example, policy information $331_5$ (refer to FIG. 4)) from the main archive device 300. A load-information database $420_1$ stores the load information $341_1$ (refer to FIG. 5) created in the controller $402_1$.

An archive file database $430_1$ stores archive files that are acquired from at least one of the servers $100_1$ to $100_n$ according to a policy corresponding to the policy information $331_5$ (refer to FIG. 4) stored in the policy-information database $410_1$.

In the sub-archive device $400_2$, a communication section $401_2$ controls communication according to a predetermined communication protocol. A controller $402_2$ performs controls related to storing of archive files, creation of the load information $341_2$ (refer to FIG. 5), and setting of the policy information. Details of operation of the controller $402_2$ are described in the latter part.

A policy-information database $410_2$ stores policy information (for example, policy information $331_4$ (refer to FIG. 5)) from the main archive device 300. A load-information database $420_2$ stores the load information $341_2$ (refer to FIG. 5) created in the controller $402_2$.

An archive file database $430_2$ stores archive files that are acquired from at least one of the servers $100_1$ to $100_n$ according to a policy corresponding to the policy information $331_4$ (refer to FIG. 4) stored in the policy-information database $410_2$. The sub-archive device $400_3$ has a configuration similar to that of the sub-archive device $400_2$.

An operation of a device according to the embodiment is described below with reference to FIGS. 6 to 10. An operation while adding the sub-archive devices when the sub-archive devices $400_1$ to $400_3$ are added to the main archive device 300 in the initial system, a load-dispersion operation for dispersing the load among the archive devices, and file-restoration operation for restoring archive files when there is an abnormality in the archive files in the archive device are described below.

Figure 6:
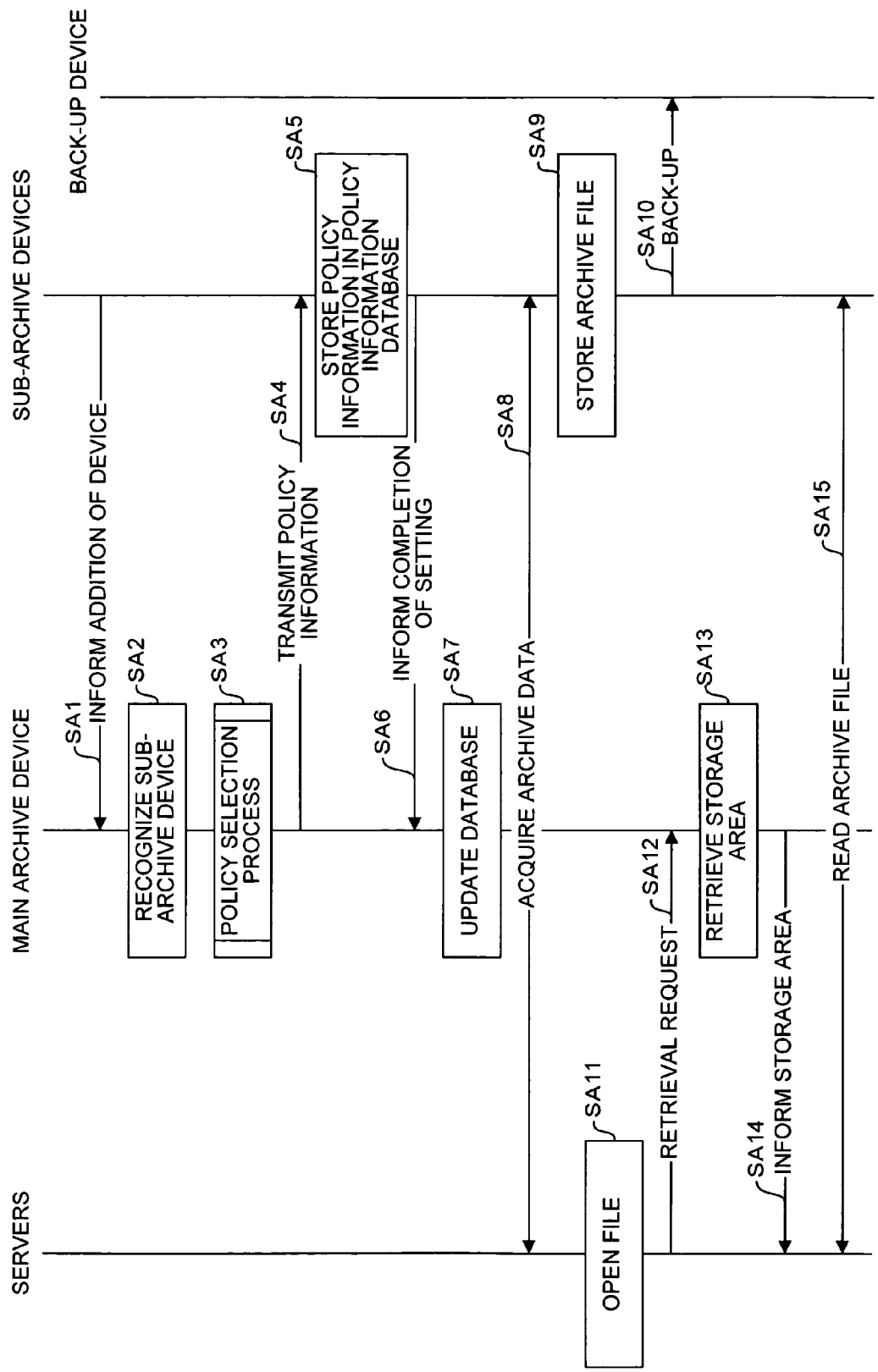
FIG. 6 is an illustration of an operation during addition.
Figure 7:
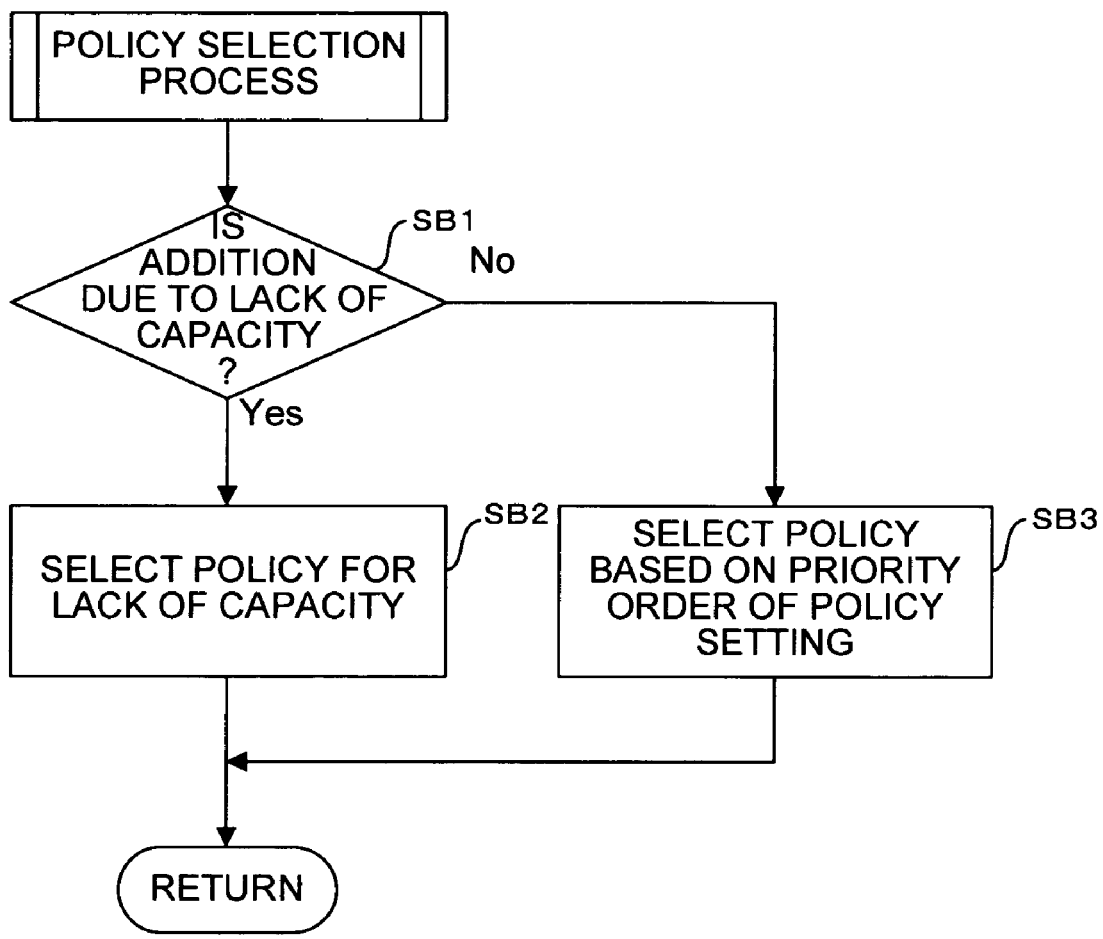
FIG. 7 is a flow chart of a policy selection process.

The operation while adding the sub-archive devices is described by referring to FIGS. 6 and 7. In the initial system in which only the main archive device 300 is connected to the LAN 200, when the sub-archive device $400_1$ is added by connecting to the LAN 200, at step SA1, the controller $402_1$ of the sub-archive device $400_1$ informs the main archive device 300.

At step SA2, the controller 302 in the main archive device 300 receives information about the addition and recognizes the sub-archive device $400_1$. At step SA3, the controller 302 performs a policy selection process to select a policy that is to be set in the sub-archive device $400_1$.

Concretely, at step SB1 in FIG. 7, the controller 302 makes a judgment of whether the addition is made due to the lack of capacity of the main archive device 300. If the addition is judged to be due to the lack of capacity (Yes at step SB1), the controller 302 selects a policy determined in advanced as a policy for the lack of capacity from policies 1 to 5 (step SB2).

In this case, if the addition is judged to be not due to the lack of capacity (No at step SB1), the controller 302 selects the policy 5 based on PRIORITY ORDER OF POLICY SETTING of the management-information database 310 shown in FIG. 2a (step SB3).

Referring back to FIG. 6, at step SA4, the controller 302 of the main archive device 300 transmits policy information to the sub-archive device $400_1$. Concretely, the controller 302 transmits the policy information $331_5$ from the policy-information database 330 (refer to FIG. 4) to the sub-archive device $400_1$ after reading the policy information $331_5$ corresponding to the policy 5 selected at step SB3 (or the policy selected at step SB2).

At step SA5, the controller $402_1$ of the sub-archive device $400_1$ stores the policy-information $331_5$ received in the policy-information database $410_1$. Thus, the setting of the policy information in the sub-archival device $400_1$ is completed. At step SA6 the controller $402_1$ informs the completion of the setting to the main archive device 300.

At step SA7, the controller 302 of the main archive device 300 updates the management-information database 310 and the property-information database 320 upon completion of the setting of the policy information $331_5$ in the sub-archive device $400_1$.

Concretely, the controller 302 updates the management-information database 310 shown in FIG. 2A to the management-information database 310 shown in FIG. 2B. Moreover, the controller 302 updates STORAGE ARCHIVE DEVICE in the property information $321_2$ (corresponding to the policy 5 set in the sub-archive device $400_1$) indicated in FIG. 3 from the main archive device 300 to the secondary archive device $400_1$.

Further, at step SA8 in FIG. 6, the controller $402_1$ of the sub-archive device $400_1$, acquires an archive file abc.jpg from the server $100_1$ for example, according to the policy information $331_5$ (refer to FIG. 4) stored in the policy-information database $410_1$. At step SA9, the controller $402_1$ stores the archive file acquired at step SA8 in the archive file database $430_1$.

At step SA10, the controller $402_1$ of the sub-archive device $400_1$ backs-up the archive file acquired at step SA8 in the tape $510_1$ of the back-up device 500, for example.

As the sub-archive devices $400_2$ and $400_3$ are added one after the other following the sub-archive device $400_1$, steps SA1 to SA10 are executed. Thus, the management-information database 310 is updated as shown in FIG. 2D.

At step SA11 shown in FIG. 6, when the server executes a task of opening the archive file called abc.jpg for example, which is stored in the archive file database $430_1$, at step SA12 the server $100_1$ outputs to the main archive device 300 a retrieval request to retrieve the archive file (abc.jpg).

At step SA13, the controller 302 of the main archive device retrieves a storage area of the archive file from the property-information database 320 with abc.jpg as a key. A retrieval result in this case is the sub-archive device $400_1$ of STORAGE ARCHIVE DEVICE of the property information $321_2$.

At step SA14, the controller 302 informs the storage area (for example address of the sub-archive device $400_1$) to the server $100_1$ from where the retrieval request is received. Based on the information of the storage area, at step SA15, the server $100_1$ makes an access to the sub-archive device $400_1$ and reads the archive file from the sub-archive device $400_1$.

The load dispersion operation is described below with reference to FIGS. 8 and 9. The load dispersion operation is performed periodically by a timer schedule.

Figure 8:
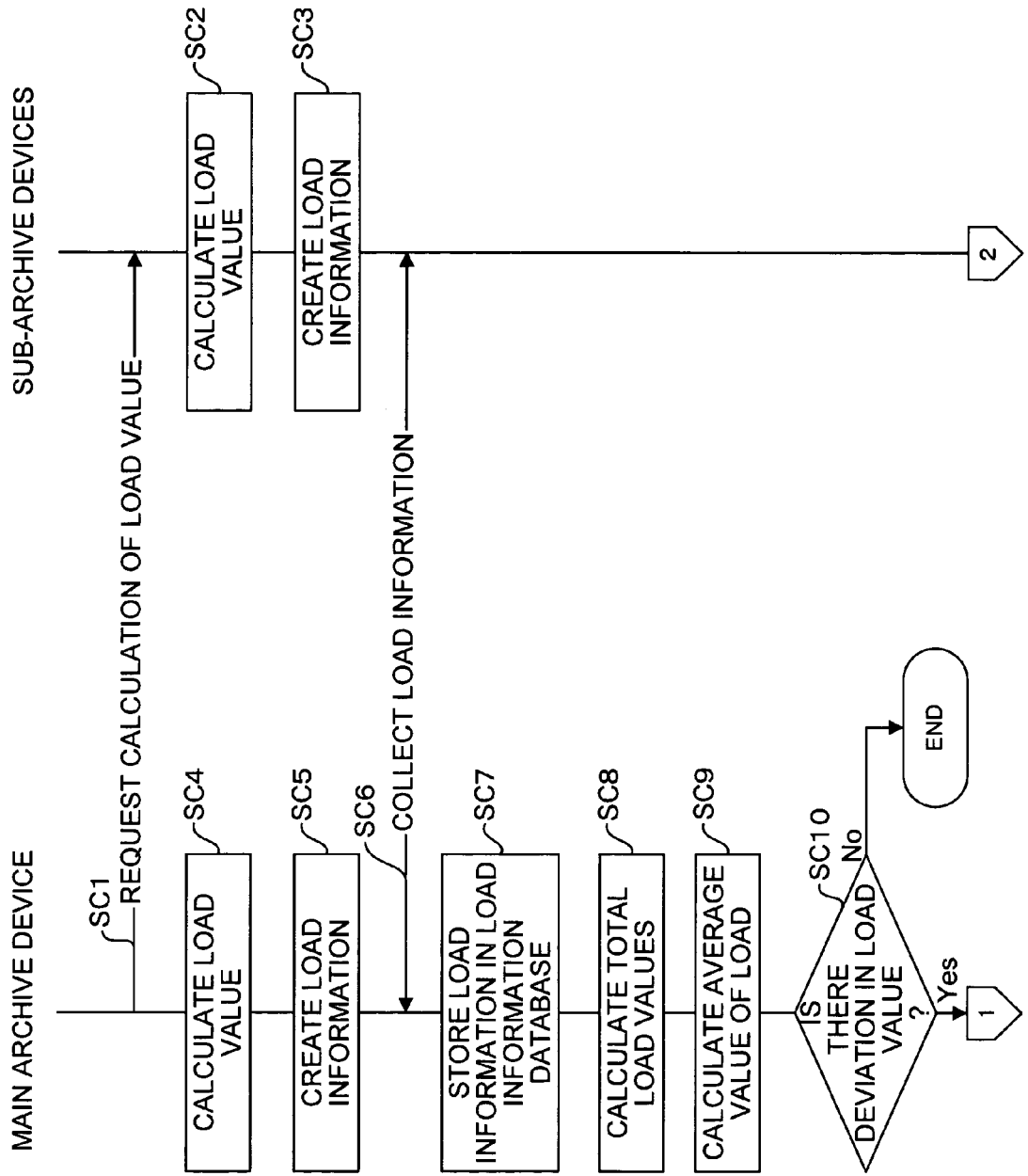
FIG. 8 is an illustration of a load-dispersion operation.

At step SC1 in FIG. 8, the controller 302 of the main archive device 300 transmits a request to the sub-archive devices $400_1$ to $400_3$ that are added, to calculate the load value.

At step SC2, the controller $402_1$ of the sub-archive device $400_1$ calculates the load value of the sub-archive device $400_1$ by multiplying the number of archive files, the access count (the number of accessed made), and the weight. At step SC3, the controller $402_1$ creates the load information $341_1$ (refer to FIG. 5) based on the calculated value at step SC2.

At step SC2 the controller $402_2$ of the sub-archive device $400_2$ calculates the load value of the sub-archive device $400_2$ by multiplying the number of archive files, the access count, and the weight. At step SC3, the controller $402_2$ creates the load information $341_2$ (refer to FIG. 5) based on the calculated value at step SC2.

Similarly, at step SC2, the controller $402_3$ of the sub-archive device $400_3$ calculates the load value of the sub-archive device $400_3$. At step SC3, the sub-archive device $400_3$ creates the load information $341_3$ (refer to FIG. 5) based on the calculated value at step SC2.

On the other hand, at step SC4, the controller 302 of the main archive device 300 calculates the load value of the main archive device 300 by multiplying the number of archive files, the access count, and the weight stored in the archive file database 350. At step SC5, the controller 302 creates the load information $341_0$ (refer to FIG. 5) based on the calculated value at step SC4.

At step SC6, the controller 302 collects the load information $341_1$ to $341_3$ (refer to FIG. 5) from the sub-archive devices $400_1$ to $400_3$. At step SC7, the controller 302 stores the load information created at step SC5 and the load information $341_1$ to $341_3$ collected at step SC6 in the load-information database 340 (refer to FIG. 5).

At step SC8, the controller 302 collects the load value of the load information $341_0$ to $341_3$ and calculates a total load value. At step SC9, the controller 302 divides the total load value by the number of archive devices (4 in this case) and calculates an average value of load.

At step SC10, the controller 302 compares the average value of load and the load value and makes a judgment of whether there is a deviation in the load value. In this case, the deviation means that the load value is greater than a predetermined value with respect to the average value of load or the load value is smaller than a predetermined value with respect to the average value of load.

If there is no deviation judged by the controller 302, the controller 302 makes a decision of normal operation, i.e. each archive device being operated with a suitable load value, and ends a series of operations.

Figure 9:
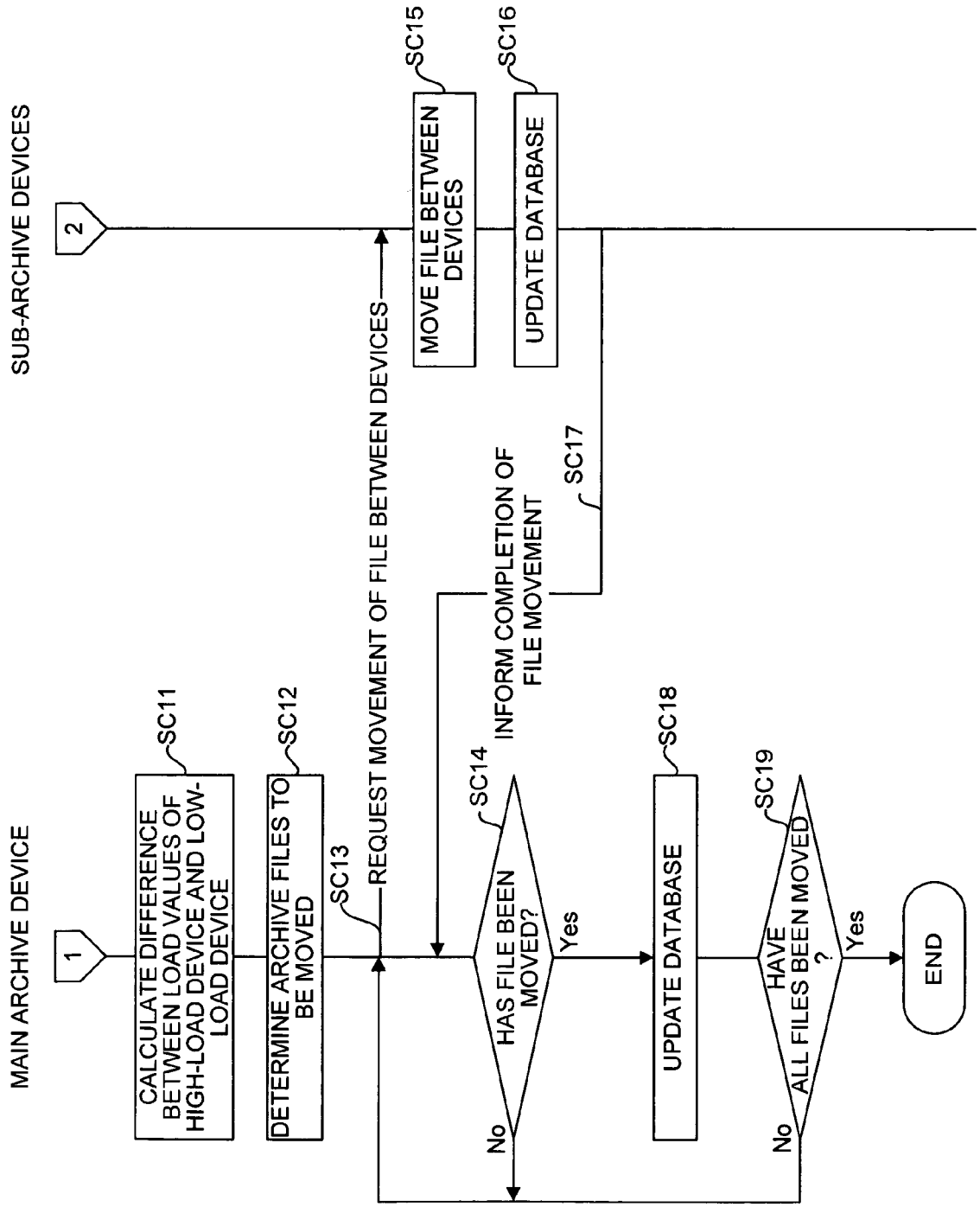
FIG. 9 is another illustration of a load-dispersion operation.

Whereas, if there is a deviation judged by the controller 302, the controller 302 calculates the difference between a load value of a high-load device and a load value of a low-load device (step SC11 in FIG. 9).

In this case, the high-load device is a device among the main archive device 300 and the sub-archive devices $400_1$ to $400_3$ on which there is maximum load, for example the sub-archive device $400_1$. The low-load device is a device among the main archive device 300 and the sub-archive devices $400_1$ to $400_3$ on which there is minimum load, for example the sub-archive device $400_2$.

At step SC12, the controller 302 determines archive files that are to be moved from the high-load device (sub-archive device $400_1$) to the low-load device (sub-archive device $400_2$) to disperse the load.

In this case, the controller 302 determines archive files corresponding to the archive file ID (0002) based on the load information $341_1$ (refer to FIG. 5) corresponding to the high-load device (sub-archive device $400_1$) as the archive files to be moved.

At step SC13, the controller sends a request to the high-load device (sub-archive device $400_1$) and the low-load device (sub-archive file $400_2$) to move the files between the devices.

At step SC14, the controller 302 makes a judgment of whether the movement of the archive files is completed. If the controller 302 judges the movement not to be completed, (No at step S14), the controller makes the judgment once again.

At step SC15, the high-load device (sub-archive device $400_1$) receives the request sent at step SC13 and moves the archive files to the low-load device (sub-archive device $400_2$). As a result, there is a reduction in load on the high-load device.

At step 16, the high-load device (sub-archive device $400_1$) and the low-load device (sub-archive device $400_2$) update the load-information database $420_1$, the load information database $420_2$ etc. upon the movement of the archive files.

At step SC17, the controller $402_1$ of the sub-archive device $400_1$ informs the completion of the archive files to the main archive device 300. The controller 302 of the main archive device 300 makes the judgment of the files being moved (Yes at step SC14).

At step SC18, the controller 302 updates the property-information database 320, the load-information database 340 etc. upon movement of the archive files. At step SC19, the controller 320 makes a judgment of whether all the files that were to be moved are moved. If the controller 320 makes a judgment of all the files being moved (Yes at step SC19), the controller ends a series of operations. If the controller 320 makes a judgment of all the files not being moved (No at step SC19), steps SC13 to Sc18 are repeated.

File-restoration Operation

The file restoration operation of a device according to the embodiment is described below with reference to FIG. 10. The file-restoration operation is performed periodically by a timer schedule similarly as in the load dispersion operation.

Figure 10:
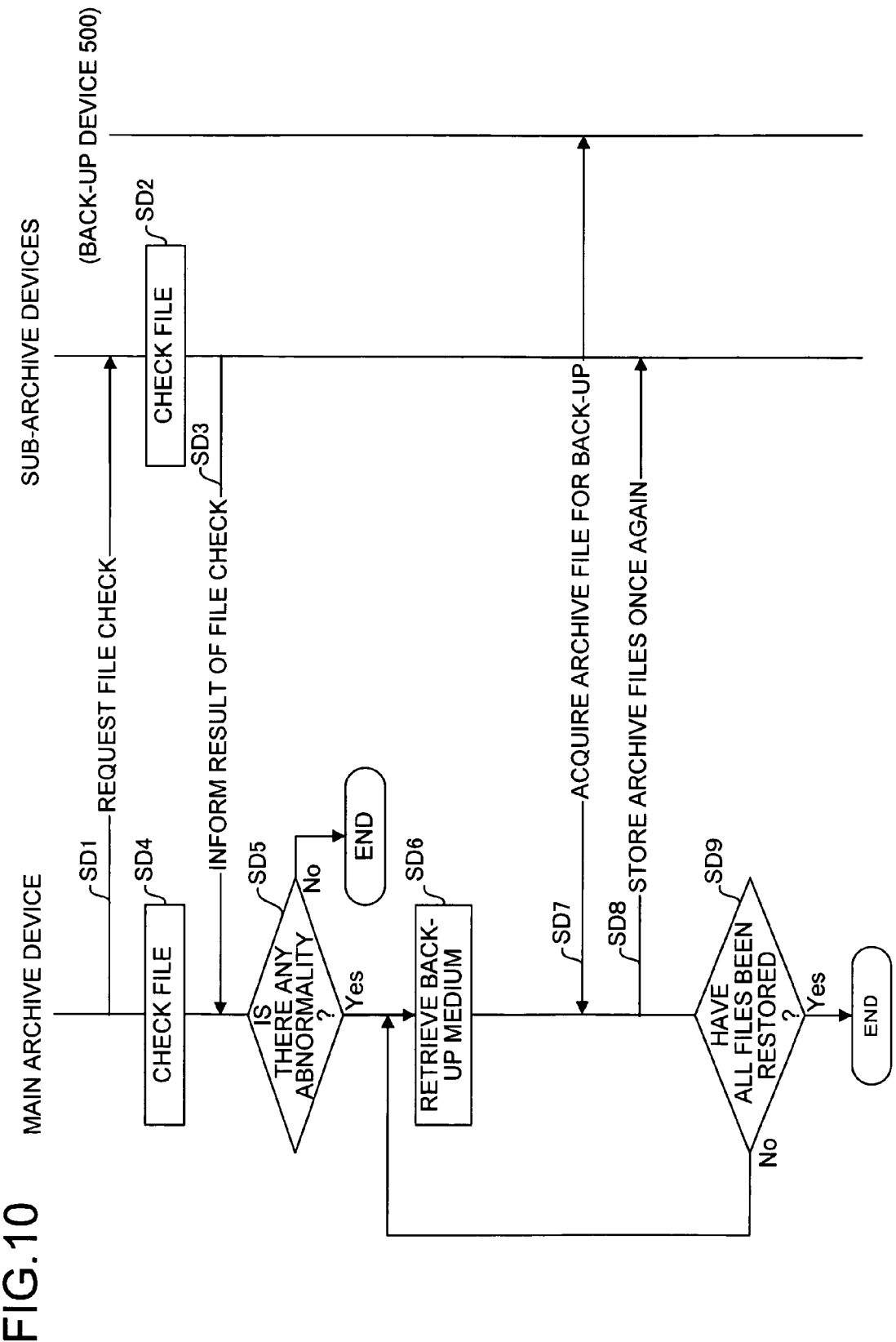
FIG. 10 is an illustration of a file-restoration operation.

At step SD1 in FIG. 10, the controller 302 sends a file-check request to the sub-archive devices $400_1$ to $400_3$ to check that the archive files are normal.

At step SD2, the archive files that are stored in each archive file database in the sub-archive devices $400_1$ to $400_3$ are checked according to the request. At step SD3, the sub-archive devices $400_1$ to $400_3$ inform results of the file check (archive file ID, normal status or abnormal status) to the main archive device 300.

In this case, an archive file stored in the archive file database $430_1$ of the sub-archive device $400_1$ being damaged the sub-archive device $400_1$ informs the result of the file check to the main-archive device 300 as abnormal.

At step SD4, the controller 302 checks if the archive files that are stored in the archive file database 350 are normal. At step SD5, the controller 302 makes a judgment of whether there is an abnormality is file-check results that are informed at step SD3 and file check results at step SD4.

In this case, a file-check result informed by the sub-archive device $400_1$ being abnormal, the controller 302 makes the judgment of the result to be abnormal (Yes at step SD5). If the controller 302 makes the judgment of the result to be normal (No at step SD5), the controller 302 ends a series of the file-restoration operations.

At step SD6, the controller 302 retrieves the tape $510_1$ from the property-information database 320 (refer to FIG. 3) as a back-up medium that stores the damaged archive files with an archive file ID of the file check result (abnormal status) informed by the sub-archive device $400_1$ as a key.

At step SD7, the controller 302 makes an access to the back-up unit 500 and acquires the archive files for the back-up from the tape $510_1$. At step SD8, the controller 302 makes an access to the sub-archive device $400_1$ and once again stores the archive files acquired, in the archive file database $430_1$.

Thus the damaged archive file is replaced by the archive file for back-up thereby restoring the archive file. At step SD9, the controller 302 makes a judgment of whether all archive files damaged are restored. If all the archive files damaged are judged to be restored (Yes at step SD9), the controller 302 ends a series of file-restoration operation. If not all the archive files damaged are judged to be restored (No at step SD9), steps SD6 to SD8 are repeated.

Thus, according to the embodiment, a policy related to the archive method is set in the sub-archive devices $400_1$ to $400_3$ according to information of addition from the sub-archive devices added and a uniform management of location of each archive file archived in the sub-archive devices $400_1$ to $400_3$ is performed. The retrieval-requests for the retrieval of archive are received collectively from the servers 1001 to 100n and the retrieval result is informed to the server. As a result, the information of addition (of sub-archive devices) is not required to be set for each server as it is set in the conventional devices. This enables to reduce load on administrator due to the addition of devices.

The load values (load status) of the main archive device 300 and the sub-archive devices $400_1$ to $400_3$ are checked and if there is an archive device that has a load greater than the predetermined load (high load), the archive files are moved from the sub-archive device to another archive device. As a result, it is possible to reduce load on the administrator due to the addition of devices and improve load efficiency.

Another archive-device is made to be an archive device that has the lowest load. As a result, it is possible to suppress unevenness in loads between the archive devices and to improve the load efficiency.

When an archive file is archived, other archive files are saved in the back-up device 500. If there is an abnormal archive file in any one of main archive devices 300 or the sub-archive devices $400_1$ to $400_3$, the normal archive file is acquired from the back-up device 500 and the abnormal archive file is replaced by the normal archive file. As a result, it is possible to reduce load on the administrator and improve reliability of the archive files.

The embodiment according to the present invention is described with reference to the diagrams. However, the concrete configuration is not restricted to this embodiment and any change is the design that is within the scope where there is no deviation from the basic idea of the present invention, is included in the present invention.

Figure 11:
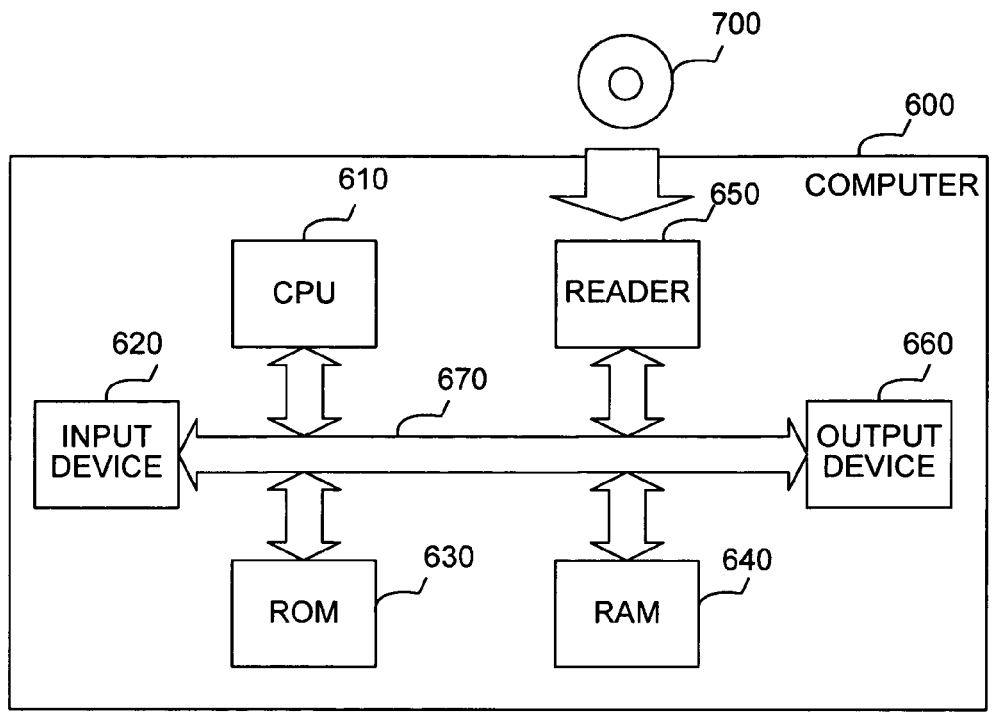
FIG. 11 is a block diagram of an archive system according to another embodiment of the present invention.
Figure 12:
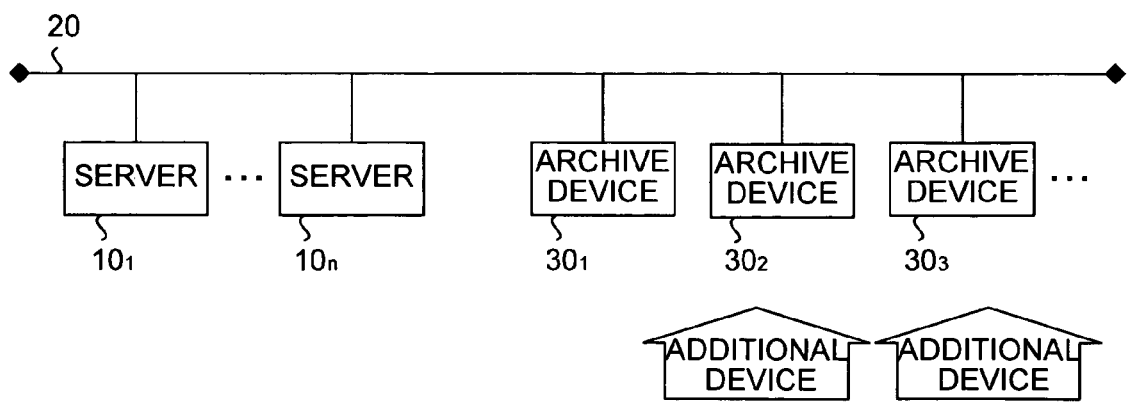
FIG. 12 is a block diagram of a conventional archive system.

For example, according to the embodiment, a computer program that realizes functions of the main archive device 300 and the sub-archive devices $400_1$, $400_2$, and $400_3$ is recorded in a computer-readable recording medium 700 shown in FIG. 11. The computer program recorded in the recording medium 700 is loaded in a computer 600 shown in FIG. 11 and the functions are realized by executing the computer program.

The computer 600 includes a CPU 610, an input device 620 like a key board, a mouse etc, a ROM 630 that stores data, a RAM 640 that stores calculation parameters, a reader 650 that reads a computer program from the recording medium, an output device 660 like a display or a printer, and a bus 670 that connects different sections in the device.

The CPU 610 executes a computer program after reading the computer program recorded in the recording medium via the reader 650, thereby realizing (achieving) the functions. An optical disc, a flexible disc, and a hard disc etc. are the example of the recording medium 700.

Thus, according to the present invention, information of addition is not required to be set for each external device. This enables to reduce load on the administrator due to the addition of devices.

Moreover, it is possible to reduce load on the administrator due to the addition of devices and improve load efficiency.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A method of managing a main archive device for use in an archive system with a capability of adding sub-archive devices, the method comprising:
obtaining a management data set for use in managing the main archive device and the sub-archive devices, the management data set including a plurality of policies each associating an identifier of a file to be archived with an identifier of an archive original server that stores the file to be archived and from which the file to be archived is acquired, and a priority order of policy setting indicating a priority order of the policies that are to be set to the sub-archive devices when the sub-archive devices are added,
judging a policy to be set to a newly added sub-archive device based on the priority order of policy setting, said judging being in response to a reception of information indicating the sub-archive devices are added from an newly added sub-archive device;
setting the judged policy to the newly added sub-archive device; and
updating the management data set such that the management data set reflects a present status of the archive system including the newly added sub-archive device.

2. The method according to claim 1, further comprising:
checking load status of each of the main archive device and the sub-archive devices; and
if a first archive device exceeds a second archive device in the load status by more than a predetermined value, controlling the first archive device and the second archive device to move data files from the first archive device to the second archive device.

3. The method according to claim 2, further comprising:
checking load status of each of the main archive device and the sub-archive devices; and
if a difference between a first archive device and a second archive device in the load status is less than a predetermined value, doing nothing.

4. The method according to claim 1, further comprising:
when a data file is archived, saving the archived data files in a back-up unit;
checking whether each of data files in the main archive device and the sub-archive devices is normal; and
if an abnormal data file is found, acquiring a normal data file corresponding to the abnormal data file from the back-up unit and replacing the abnormal data file with the normal data file.

5. The method according to claim 1, wherein
the judging includes judging whether the cause of addition is the lack of the main archive device, wherein
if the cause of addition is the lack of capacity of the main archive device, selecting a predetermined policy for the lack of capacity from the management data set, and
if the cause of addition is not the lack of capacity of the main archive device, selecting a policy based on the order of priority set from the management data set.

6. A computer-readable medium storing a software system for managing a main archive device for use in an archive system with a capability of adding sub-archive devices, the software system comprising:
a management data set for use in managing the main archive device and the sub-archive device, the management data set including a plurality of policies each associating an identifier of a file to be archived with an identifier of an archive original server that stores the file to be archived and from which the file to be archived is acquired, and a priority order of policy setting indicating a priority order of the policies that are to be set to the sub-archive devices when the sub-archive devices are added;
a computer program causing the main archive device to execute:
judging a policy to be set to a newly added sub-archive device based on the priority order of policy setting in response to a reception of information indicating the sub-archive devices are added from an newly added sub-archive device;
setting the judged policy to the newly added sub-archive device; and
updating the management data set such that the management data set reflects a present status of the archive system including the newly added sub-archive device.

7. The computer-readable medium according to claim 6, wherein the computer program further makes the main archive device execute:
checking load status of each of the main archive device and the sub-archive devices; and
if a first archive device exceeds a second archive device in the load status by more than a predetermined value, controlling the first archive device and the second archive device to move data files from the first archive device to the second archive device.

8. The computer-readable medium according to claim 6, wherein the computer program further makes the main archive device execute:
checking load status of each of the main archive device and the sub-archive devices; and
if a difference between a first archive device and a second archive device in the load status is less than a predetermined value, doing nothing.

9. The computer-readable medium according to claim 6, wherein the computer program further causes the main archive device to execute:
when a data file is archived, saving a copy of the archived data files in a back-up unit;
checking whether each of data files in the main archive device and the sub-archive devices is normal; and
if an abnormal data file is found, acquiring a normal data file corresponding to the abnormal data file from the back-up unit and replacing the abnormal data file with the normal data file.

10. The computer-readable medium according to claim 6, wherein the software system further comprises a property data set comprised of respective pieces of property data for all data files stored in the archive system, and wherein the computer program makes the main archive device execute:
in response to a reception of a retrieval request for a data file stored in the archive system from an external device, searching the property data set for a storage location of the requested data file stored in the archive system; and
informing the external device of the storage location.

11. The computer-readable medium according to claim 6, wherein
the judging includes judging whether the cause of addition is the lack of the main archive device, wherein
if the cause of addition is the lack of capacity of the main archive device, selecting a predetermined policy for the lack of capacity from the management data set, and
if the cause of addition is not the lack of capacity of the main archive device, selecting a policy based on the order of priority set from the management data set.

12. A main archive device for use in an archive system with a capability of adding sub-archive devices, comprising:
- a storage that stores a management data set for use in managing the main archive device and the sub-archive devices, the management data set including a plurality of policies each associating an identifier of a file to be archived with an identifier of an archive original server that stores the file to be archived and from which the file to be archived is acquired, and a priority order of policy setting indicating a priority order of the policies that are to be set to the sub-archive devices when the sub-archive devices are added;
- a policy-judging unit, in response to a reception of information indicating the sub-archive devices are added from a newly added sub-archive device, that judges the policy be set to the newly added sub-archive device based on the priority order of policy setting;
- a policy-setting unit that sets the judged policy to the newly-added sub-archive device; and
- a managing unit that updates the management data set such that the management data set reflects a present status of the archive system including the newly added sub-archive device.

13. The archive device according to claim 12, further comprising:
- a load-status checking unit that checks load status of each of the main archive device and the sub-archive device; and
- a load-dispersing unit, responsive to a determination that a first archive device exceeds a second archive device in the load status by more than a predetermined value, for controlling the first archive device and the second archive device to move data files from the first archive device to the second archive device.

14. The archive device according to claim 13, further comprising:
- a load-dispersing unit, responsive to a determination that a difference between a first archive device and a second archive device in the load status is less than a predetermined value, for doing nothing.

15. The archive device according to claim 12, further comprising:
- a back-up unit that, when a data file is archived, saves a copy of the archived data file;
- a normal-file checking unit that checks whether each of data files in the main archive device and the sub-archive devices is normal; and
- a file-restoration unit that, if an abnormal data file is found, acquires a normal data file corresponding to the abnormal data file from the back-up unit and replaces the abnormal data file with the normal data file.

16. The main archive device according to claim 12, wherein
the policy-judging unit judges whether the cause of addition is the lack of the main archive device, wherein
    if the cause of addition is the lack of capacity of the main archive device, selecting a predetermined policy for the lack of capacity from the management data set, and
    if the cause of addition is not the lack of capacity of the main archive device, selecting a policy based on the priority order of policy setting.

17. An archive system which enables a user to add a storage capacity, comprising:
- a main archive device for storing data files; and
- at least one sub-archive device storing additional data files, wherein the main archive device includes:
    - a storage that stores a management data set for use in managing the main archive device and the sub-archive device, the management data set including a plurality of policies each associating an identifier of a file to be archived with an identifier of an archive original server that stores the file to be archived and from which the file to be archived is acquired, and a priority order of policy setting indicating a priority order of the policies that are to be set to the sub-archive devices when the sub-archive devices are added,
    - a policy-judging unit, in response to a reception of information indicating the sub-archive devices are added from a newly added sub-archive device, that judges the policy to be set to the newly added sub-archive device based on the priority order of policy setting;
    - a policy-setting unit that sets the judged policy to the newly added sub-archive device; and
    - a managing unit that updates the management data set such that the management data set reflects present status of the archive system including the newly added sub-archive device, and
  the sub-archive device includes:
    - a controlling unit that acquires the file to be archived from the archive original server according to the policy set by the policy-setting unit, and stores the file acquired in an archive file database.

18. The archive system according to claim 17, wherein when the added sub-archive device is added to a lack of capacity, the policy-setting unit sets the policy data of the added sub-archive device based on a predefined policy for lack of capacity.

19. The archive system according to claim 17, wherein the policy-judging unit judges whether the cause of addition is the lack of the main archive device, wherein
    if the cause of addition is the lack of capacity of the main archive device, selecting a predetermined policy for the lack of capacity from the management data set, and
    if the cause of addition is not the lack of capacity of the main archive device, selecting a policy based on the priority order of policy setting.

* * * * *

UNITED STATES PATENT AND TRADEMARK OFFICE
CERTIFICATE OF CORRECTION

| | | |
|---|---|---|
| PATENT NO. | : 8,108,354 B2 | |
| APPLICATION NO. | : 10/785946 | |
| DATED | : January 31, 2012 | |
| INVENTOR(S) | : Kunihiko Kassai | |

It is certified that error appears in the above-identified patent and that said Letters Patent is hereby corrected as shown below:

In the Claims:

Column 13, Line 16 (Approx.), In Claim 12, delete "policy" and insert -- policy to --, therefor.

Column 14, Line 39 (Approx.), In Claim 18, delete "added" and insert -- added due --, therefor.

Signed and Sealed this
Twenty-fifth Day of December, 2012

David J. Kappos
*Director of the United States Patent and Trademark Office*